(12) United States Patent
Johnson et al.

(10) Patent No.: US 6,277,183 B1
(45) Date of Patent: Aug. 21, 2001

(54) INK COMPOSITIONS CONTAINING METAL OXIDES

(75) Inventors: Joseph E. Johnson, Nashua, NH (US); J. Christine Bedford, Burlington (CA); Ronald J. Gambale, Wakefield, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/411,598

(22) Filed: Oct. 4, 1999

Related U.S. Application Data

(60) Provisional application No. 60/103,548, filed on Oct. 8, 1998.

(51) Int. Cl.$^7$ .................................................... C09D 11/02
(52) U.S. Cl. ................ 106/31.27; 106/31.6; 106/31.75; 106/31.9; 106/475
(58) Field of Search ............................... 106/31.27, 31.6, 106/31.75, 31.9, 475

(56) References Cited

U.S. PATENT DOCUMENTS

| | | | |
|---|---|---|---|
| 4,445,124 | 4/1984 | Fujii et al. | 347/89 |
| 5,026,427 | 6/1991 | Mitchell et al. | 106/31.6 |
| 5,139,574 | 8/1992 | Winnik et al. | 106/31.27 |
| 5,209,998 | 5/1993 | Kavassalis et al. | 430/106 |
| 5,221,332 | 6/1993 | Kohlmeier | 106/31.27 |
| 5,258,065 | 11/1993 | Fujisawa | 106/31.48 |
| 5,269,840 | 12/1993 | Morris et al. | 106/437 |
| 5,338,597 | 8/1994 | Kurabayashi et al. | 428/195 |
| 5,378,574 | 1/1995 | Winnik et al. | 430/115 |
| 5,439,514 | 8/1995 | Kashiwazaki et al. | 106/31.65 |
| 5,539,038 | 7/1996 | Katsen et al. | 524/399 |
| 5,554,739 | 9/1996 | Belmon | 534/885 |
| 5,571,311 | 11/1996 | Belmont et al. | 106/31.6 |
| 5,630,868 | 5/1997 | Belmont et al. | 106/31.75 |
| 5,672,198 | 9/1997 | Belmont | 106/31.6 |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |
| 5,713,993 | 2/1998 | Page et al. | 106/31.85 |
| 5,719,204 | 2/1998 | Beach et al. | 523/161 |
| 5,747,562 | 5/1998 | Mahmud et al. | 523/215 |
| 5,749,950 | 5/1998 | Mahmud et al. | 106/31.6 |
| 5,803,959 | 9/1998 | Johnson et al. | 106/31.75 |
| 5,837,045 | 11/1998 | Johnson et al. | 106/31.85 |
| 5,851,280 | 12/1998 | Belmont et al. | 106/472 |
| 5,895,522 | 4/1999 | Belmont et al. | 106/31.6 |
| 5,922,118 | 7/1999 | Johnson et al. | 106/31.6 |

FOREIGN PATENT DOCUMENTS

WO 96/18688 6/1996 (WO).

OTHER PUBLICATIONS

WPI/Derwent Abstract No. 94–189154 of Japanese Patent No. 62 28517 (In English), 2/91.
DuPont Product Information, Ludlox® colloidal silica, "Properties, Uses, Storage, and Handling" pp. 1–19, No Date Available.
Clariant Material Safety Data Sheet for Hostafine Black TS, revised Dec. 8, 1997.
Cabot Technical Data, "The Use of CAB–O–SIL® Fumed Silica in Inks" TD–116, 8/94.
Degussa Brochure on "Precipitated Silicas" (25 pages including covers) and attached Jan. 4, 1993 letter from Degussa to its customers.
Degussa Brochure on "Aerosil® Fumed Silica" (35 pages including covers, No Date Available.
Degussa Brochure "Precipitated Silica", Degussa Corporation, DC–1211 (6 pages), No Date Available.
Cabot Brochure "CAB–O–SIL Fumed Silica Properties and Functions", pp. 1–36, plus covers, 2/90.
Cabot Brochure "CAB–O–SIL Fumed Silicas", 6 pages, 3/96.
Cabot–corp.com web page printout "CAB–O–SIL® Fumed Silica In Inks", Cabot Applications Feb. 26, 1998.

*Primary Examiner*—Helene Klemanski

(57) ABSTRACT

An ink composition is disclosed which comprises at least one ink vehicle, at least one colorant and at least one metal oxide. The colorant may be a dye or a pigment, or both, and the colorant is non-reactive with the metal oxide in the ink vehicle. Also disclosed are inkjet formulations using the above-described compositions and methods of improving such properties as optical density.

43 Claims, No Drawings

INK COMPOSITIONS CONTAINING METAL OXIDES

This application is entitled to benefit from the prior Provisional Application No. 60/103,548 filed Oct. 8, 1998, which is incorporated in its entirety by reference herein.

BACKGROUND OF THE INVENTION

The present invention relates to ink compositions, and particularly, to ink compositions containing one or more metal oxides which can improve various properties.

Inkjet printing is a non-impact process wherein droplets of ink are produced and deposited on a substrate such as paper, transparent film, or textile material in response to an electronic signal. Typical inkjet printing systems are continuous stream or drop-on-demand type. In continuous inkjet systems, ink is emitted in a continuous stream under pressure through at least one orifice or nozzle. The stream is perturbed causing it to break up into droplets at a fixed distance from the orifice. At the breakup point, the droplets are charged in accordance with digital data signals and passed through an electrostatic field. The field adjusts the trajectory of each droplet to direct it to a gutter for recirculation or to a specific location on a recording medium to create images. In drop-on-demand systems, a droplet is expelled from an orifice directly to a position on a recording medium by pressure generated in accordance with digital data signals. A droplet is not formed or expelled unless it is to be placed on the recording medium. The drop-on-demand system has several advantages over the continuous system in that it requires no ink recovery, charging, or deflection.

Generally, there are three basic types of drop-on-demand inkjet systems. The first type is known as a piezoelectric system. In one kind of piezoelectric printer, ink fills a channel with a nozzle on one end and a piezoelectric transducer produces pressure pulses near the other end.

A second type of drop-on-demand system is known as thermal inkjet or bubble jet. The major components are an ink-filled channel with a nozzle at one end and a heat generating resistor near the nozzle. Printing signals create an electric current pulse in a resistive layer within each ink passageway, causing the ink in the immediate vicinity to vaporize, creating a bubble. Some of the ink in the channel is forced out through the orifice as a propelled droplet due to bubble expansion. Thermal or bubble inkjet printers produce high velocity droplets and allow very close spacing of nozzles, which results in a high quality of print.

The third type of drop-on-demand inkjet device is known as an acoustic ink printer. This printer utilizes a focused acoustic beam formed with a spherical lens illuminated by a plane wave of sound created by a piezoelectric transducer. The focused acoustic beam exerts pressure on the surface of the liquid, resulting in the ejection of small droplets of ink onto an imaging substrate.

Conventional inks for inkjet printers generally comprise a colorant such as dye which is soluble in a vehicle of water or a mixture comprising water and a water-soluble or water-miscible organic solvent. However, dyes have several disadvantages when used in inkjet inks. Dyes, being water-soluble or soluble in a water and organic mixture, may redissolve and run when exposed to moisture or water. Dye images may smear and rub off on contact with felt pen markers or upon being rubbed with a finger. Dyes may also exhibit poor light stability, including fluorescence, sunlight, and ultraviolet light. Inks comprising soluble dyes may also exhibit clogging of the jetting channels due to solvent evaporation and changes in the dye's solubility, dye crystallization, and the presence of impurities. Dye-based ink may also exhibit poor thermal and chemical stability which could result in poor print quality. The dye may also bleed or diffuse into pores or along fibers of the paper, thus causing poor print quality and low optical density of the image.

Pigments have also been used as colorants in inkjet inks, either as substitutes for, or in combination with, dyes. Pigments offer properties superior to dyes in areas such as waterfastness, lightfastness, image density, thermal stability, oxidative and chemical stability, compatibility with other colorants, and compatibility with both coated/treated and plain papers. Pigments used in inkjet inks include carbon black, titanium dioxide, cobalt blue ($CoO$—$Al_2O_3$), chrome yellow ($PbCrO_4$), phthalocyanine blue, and other organic pigments. Other pigments include inorganic and polymer pigments, wherein these pigments and organic pigments can have dyes absorbed and/or incorporated therein. Carbon black, which absorbs in the infrared region, may be used for bar code reading.

The major problem with the use of such pigments in inkjet systems is initial dispersion and dispersion stability. Pigment particles such as carbon black generally start in a clumped or agglomerated state. To prepare inkjet inks, however, the carbon black must be dispersed and stabilized in that form because the extent of dispersion directly affects inkjet printing characteristics such as ejectability, print quality, optical density, and the like. Additionally, since the nozzle openings of thermal or bubble type inkjet printers are typically about 10–60 micrometers in diameter, it is critical to ensure that the inkjet inks do not clog or plug these openings. Thus, it is necessary to make the pigment particles as small as possible. Preferably carbon black is reduced to individual aggregates. Small pigment particles are also less prone to settling during storage and therefore further contribute to the stability of the carbon black dispersion.

In light of these requirements, conventional aqueous pigment-based inkjet inks generally contain an aqueous ink vehicle, a pigment, a dispersant, and a humectant to prevent drying of ink or the clogging of orifices. Further additives such as biocides, binders, salts, driers, penetrants, surfactants, and the like may also be included.

The conventional inks, whether containing a colorant which is a dye, a pigment or a combination thereof, require improvement in a number of properties. In particular, it is desirable to decrease drying time of the ink, increase water-and-smear-resistance of the images, increase optical density of the print, and provide better quality images with less intercolor bleed.

SUMMARY OF THE INVENTION

A feature of the present invention is to provide ink compositions which overcome one or more of the disadvantages described above.

Another feature of the present invention is to provide ink compositions which provide a decreased drying time of the ink, an increased water-and-smear-resistance of images, an increased optical density of the print, and/or quality images with less intercolor bleed.

A further feature of the present invention is to provide methods of making these ink compositions.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description and appended claims.

To achieve these and other advantages and in accordance with the purpose of the present invention, as embodied and broadly described herein, the present invention relates to an ink composition, preferably, an inkjet ink composition, comprising at least one ink vehicle, at least one pigment, and at least one metal oxide. The metal oxide may also be a particle coated with a metal oxide shell. The pigment is preferably non-reactive with the metal oxide in the ink vehicle.

The present invention also relates to an ink composition, preferably an inkjet ink composition, comprising at least one ink vehicle, at least one dye, and at least one oxide of Al, Fe, Zn, Ni, Ti, V, Cr, Co, Cu, Mg, or Zr or mixtures thereof.

In addition, the present invention relates to an ink composition, preferably an inkjet ink composition, comprising at least one ink vehicle, at least one dye, and silica in an amount of at least 7% by weight of the composition, wherein the dye is non-reactive with the silica in said ink vehicle.

The inks of this invention preferably offer desirable image properties such as decreased drying time of the ink, increased water-and-smear-resistance of the image, increased optical density of the print, and better quality images with less intercolor bleed as compared to ink compositions not containing metal oxide particles.

The present invention further relates to a method of increasing optical density and/or smear resistance of an image resulting from an ink composition which includes the step of adding or incorporating at least one type of metal oxide particles into the ink composition.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to several embodiments of ink compositions comprising at least one ink vehicle, at least one colorant, and at least one type of metal oxide particle.

In one embodiment of the present invention, the present invention relates to an ink composition which is preferably an inkjet ink composition. The ink composition comprises at least one ink vehicle, at least one pigment, and at least one metal oxide. The ink vehicle may be an aqueous inkjet ink vehicle or a non-aqueous inkjet ink vehicle. The pigment can be reactive or non-reactive with the metal oxide in the ink vehicle. In other words, the pigment can covalently bond, adsorb, or be attached by other means with the metal oxide, or the pigment and metal oxide can be present as a mixture with no reaction occurring between the pigment and metal oxide while in the ink vehicle. Preferably, the pigment is non-reactive with the metal oxide in the ink vehicle, which preferably is an inkjet ink vehicle.

In another embodiment of the present invention, the present invention relates to an ink composition, which is preferably an inkjet ink composition, wherein the ink composition comprises at least one ink vehicle, at least one dye, and at least oxide of aluminum, iron, zinc, nickel, titanium, vanadium, chromium, cobalt, copper, magnesium, or zirconium, or combinations thereof. The dye can be reactive or non-reactive with the metal oxide in the ink vehicle. Preferably, the dye is non-reactive with the metal oxide and the metal oxide and dye remain as a mixture while in the ink vehicle, which is preferably an inkjet ink vehicle.

Also, in another embodiment of the present invention, the present invention relates to an ink composition, which is preferably an inkjet ink composition, comprising at least one ink vehicle, at least one dye, and silica in an amount of at least 7% by weight of the ink composition. In this embodiment, the dye is non-reactive with the silica while in the ink vehicle, which is preferably an inkjet ink vehicle. With respect to this embodiment and the amount of silica present in the ink composition, the silica can be present in amounts of at least 7%, 8%, 9%, 10% by weight or higher based on the weight of the ink composition. Preferably, the amount of silica present in the ink composition is at least 10% by weight, and more preferably is from at least 10% by weight to about 50% by weight, and even more preferably is from at least 10% by weight to about 25% by weight.

The present invention further relates to an aqueous inkjet ink composition comprising an aqueous vehicle, silica and a modified carbon product comprising carbon having attached at least one organic group. The at least one organic group comprises (a) at least one aromatic group or a $C_1$–$C_{12}$ alkyl group, and (b) at least one ionic group, at least one ionizable group, or a mixture of an ionic group and an ionizable group, wherein the at least one aromatic group or the $C_1$–$C_{12}$ alkyl group of the organic group is directly attached to the carbon.

The dyes and/or pigments used in the present invention depending upon the embodiment are discussed below and applies to each of the embodiments set forth above.

The dye or pigment can be, but is not limited to, dyes and pigments traditionally used in ink compositions, especially inkjet ink compositions.

Examples include, but are not limited to, black pigments (e.g., carbon black and HOSTAFINE® Black TS-Hoechst Celanese), other colored pigments (e.g., inorganic and/or organic pigments), color dyes (e.g., BASACID® BLACK X 34 from BASF), modified colorant products (e.g., modified carbon products described in U.S. Pat. Nos. 5,620,868; 5,571,311; 5,672,198; 5,713,988; and 5,698,016, and U.S. patent application Ser. No. 08/873,021 filed Jun. 11, 1997, and modified colorant products described in U.S. patent application Ser. No. 08/871,453 filed Jun. 9, 1997 and 08/628,202 filed Apr. 5, 1996, all incorporated herein in their entirety by reference). The pigment or dye used in the present invention preferably includes at least one organic group attached thereto or as a part thereof, and preferably comprises at least one aromatic group or a $C_1$–$C_{12}$ alkyl group and at least one ionic group, at least one ionizable group, or a mixture of an ionic group and an ionizable group. More preferably, the aromatic group and/or $C_1$–$C_{12}$ alkyl group is directly attached to the pigment and/or dye. When an embodiment includes the use of a pigment, the pigment is preferably carbon black or modified carbon black.

A wide range of conventional colored pigments and/or dyes may be used in the present invention, such as white, black, blue, brown, cyan, green, violet, magenta, red, yellow, as well as mixtures thereof. Suitable classes of colored pigments include, for example, anthraquinones, phthalocyanine blues, phthalocyanine greens, diazos, monoazos, pyrathrones, perylenes, heterocyclic yellows, quinacridones, and (thio)indigoids. Representative examples of phthalocyanine blues include copper or other metal phthalocyanine blues and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyrathrone Red) and Pigment Red 226 (Pyrathrone Red). Representative examples of perylenes include Pigment Red 123 (Vermilion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellow include Pigment Yellow 117 and Pigment Yellow 138. Examples of other suitable colored pigments are described in *Colour Index,* 3rd edition (The Society of Dyers and Cikiyrusts, 1982), incorporated in its entirety by reference herein.

Additional examples of conventional dyes and pigments that may be used are described in U.S. Pat. Nos. 5,719,204; 5,539,038; and 5,026,427 all incorporated in their entirety by reference herein. While any particle size of the pigment conventionally used in ink compositions can be used, preferably the particle size is less than about 1 micron, and preferably is from about 0.010 to about 1 micron. Also, any conventional amounts of the pigment or dye can be present in the ink composition. Preferably, the pigment and/or dye is present in an amount of from about 1 wt % to about 15 wt %, and more preferably from about 3 wt % to about 5 wt %, based on the weight of the ink composition.

Carbon product as used herein, is preferably capable of reacting with a diazonium salt to form the above-mentioned modified carbon product. The carbon may be of the crystalline or amorphous type. Examples include, but are not limited to, graphite, carbon black, vitreous carbon, carbon fibers, activated charcoal, and activated carbon. Finely divided forms of the above are preferred; also, it is possible to utilize mixtures of different carbons.

The modified pigment may be prepared by reacting the pigment as defined above, with a diazonium salt in a liquid reaction medium to attach at least one organic group to the surface of the pigment. Preferred reaction media include water, any medium containing water, and any medium containing alcohol. Water is the most preferred medium. These modified pigment products, wherein the pigment is carbon black, and various methods for their preparation are described in U.S. patent application Ser. No. 08/356,660 now abandoned, entitled "Reaction of Carbon Black with Diazonium Salts, Resultant Carbon Black Products and Their Uses," filed Dec. 15, 1994, and its continuation-in-part application U.S. patent application Ser. No. 08/572,525, both of which are incorporated herein by reference. Modified carbon products, wherein the carbon is not carbon black, and various methods for their preparation are described in patent application Ser. No. 08/356,653, now U.S. Pat. No. 5,554,739, entitled "Reaction of Carbon Materials with Diazonium Salts and Resultant Carbon Products" filed Dec. 15, 1994, also incorporated herein by reference.

To prepare the above modified pigment products, the diazonium salt need only be sufficiently stable to allow reaction with the pigment. Thus, that reaction can be carried out with some diazonium salts otherwise considered to be unstable and subject to decomposition. Further, the reaction may be carried out at elevated temperatures where many diazonium salts may be susceptible to decomposition. Elevated temperatures may also advantageously increase the solubility of the diazonium salt in the reaction medium and improve its handling during the process.

Pigments can be reacted with a diazonium salt when present as a dilute, easily stirred, aqueous slurry, or as a more concentrated highly mixed slurry in water. In addition, when modified pigment products utilizing pigments other than carbon black are used in inks, the pigment should preferably be ground to a fine particle size before reaction with the diazonium salt to prevent unwanted precipitation in the ink. A preferred set of organic groups which may be attached to the carbon are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore include groups derived from organic acids. Preferably, when the organic groups contain an ionizable group forming an anion, such an organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the alkyl group of the organic group is directly attached to the carbon. The aromatic group may be further substituted or unsubstituted, for example, with alkyl groups.

Other preferred organic groups comprise an aromatic group or a $C_1$–$C_{12}$ group, which are preferably directly attached to the pigment and optionally contain an ionic group, ionizable group, or both.

Preferably, the organic group is a phenyl or a naphthyl group and the acidic group is a sulfonic acid group, a sulfinic acid group, a phosphonic acid group, or a carboxylic acid group. Examples include —COOH, —$SO_3H$ and —$PO_3H_2$, —$SO_2NH_2$, —$SO_2NHCOR$, and their salts, for example —COO$^-$X$^+$, —COO$^-$X$^+$, —COO$^-$X$^+$, —$SO_3^-$X$^+$, —$HPO_3^-$X$^+$, —$SO_3^-$X$^+$, and $PO_3^-$X$^+$, where X is a counter cation, e.g. Na, K, Mg, $NH_4$, Li, or $NR_4$, where R is an alkyl or phenyl group. For instance, R can be a $C_1$–$C_{20}$ alkyl. Particularly preferred ionizable substituents are —COOH and —$SO_3H$ and their sodium and ammonium salts. Other examples of ionic or ionizable groups include those wherein the ionic or ionizable group is a sulfonamide group; or wherein the organic group is a p-$C_6H_4SO_3Na$ group; or wherein the organic group is a p-$C_6H_4SO_2NH_2$ group.

More preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Most preferably, the organic group is a substituted or unsubstituted carboxyphenyl group or salt thereof; a substituted or unsubstituted (polycarboxy) phenyl group or a salt thereof; a substituted or unsubstituted carboxynaphthyl group or salt thereof; or a substituted or unsubstituted (poly carboxy) naphthyl group or salt thereof. A preferred substituted carboxyphenyl group is benzoic acid or salt thereof and a salicylic acid group or salt thereof.

Specific organic groups having an ionizable functional group forming an anion are p-sulfophenyl, 4-hydroxy-3-sulfophenyl, and 2-sulfoethyl. One example of an ionic or ionizable group is an ethane sulfonic acid or a salt thereof.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups ($-NR_3^+$) and quaternary phosphonium groups ($-PR_3^+$) also represent examples of cationic groups and can be attached to the same organic groups as discussed above for the ionizable groups which form anions. Preferably, the organic group contains an aromatic group such as a phenyl, or a naphthyl group and a quaternary ammonium or a quaternary phosphonium group. The aromatic group is preferably directly attached to the carbon. Quaternized cyclic amines, and quaternized aromatic amines, can also be used as the organic group. Thus, N-substituted pyridinium compounds, such as N-methyl-pyridyl, can be used in this regard. Examples or organic groups include, but are not limit to, $C_5H_4NC_6H_5^+$, $C_5H_4N(C_2H_5)^+$, $C_6H_4NC_5H_5^+$, $C_6H_4COCH_2N(CH_3)_3^+$, $C_6H_4COCH_2(NC_5H_5)^+$, $C_5H_4N(CH_3)^+$, and $C_6H_4CH_2N(CH_3)_3^+$. The modified colored pigments can be prepared in a similar fashion.

U.S. Pat. Nos. 5,554,739, 5,571,311, 5,749,950, 5,630,868, 5,672,198, 5,698,016, 5,707,432 and 5,713,988, PCT Publication Nos. WO/97/47697 and WO/98/13428, and U.S. patent application Ser. No. 08/909,944 further describe pigments and/or organic groups that can be present or used in the present invention, and all patents and publications are incorporated in their entirety by interest herein.

The pigment and/or dye used in the present invention is preferably non-reactive with the metal oxide in the ink vehicle. Non-reactive means that the pigment and/or dye and metal oxide will not affect the stability of each other in the ink or dispersion medium. Preferably, the pigment and/or dye and metal oxide have the same charge. In a preferred embodiment, a negatively-charged metal oxide is used with a negatively-charged pigment and/or dye. Alternatively, the pigment and the metal oxide are each positively charged.

With regard to the metal oxide, in some embodiments, any metal oxide can be used as long as the metal oxide is compatible with the other ink components. Examples of metal oxides used in the present invention include, but are not limited to, oxides of Si, Al, Fe, Zn, Ni, Ti, V, Cr, Co, Cu, Mg, and Zr. Specific examples of such oxides include $SiO_2$ (silica), $Al_2O_3$ (alumina) and $Fe_3O_4$ (magnetite). Furthermore, the metal oxide may be a mixture or combination of the above-described metal oxides. Such mixtures may be in a physical mixture or in the form of an oxide coating another oxide, such as $Al_2O_3$-coated $SiO_2$, or a metal oxide coating another particle.

In a preferred embodiment, the metal oxide is silica. The silica may be provided in a number of forms, such as colloidal silica, precipitated silica, and fumed silica. Use of fumed silica may also act as a viscosity control agent of the ink. Examples of silica include Ludox® brand silica available from Dupont, Snowtex® brand silica from Nissan Industries, Cab-O-Sperse® and other types of silica from Cabot Corporation, ARCS brand silica from Applied Research.

The amount of metal oxide present in the ink compositions of the present invention is preferably an amount which promotes ink or print properties. In some embodiments, the amount of metal oxide particles preferably ranges from about 0.01 to about 49.5 wt %, more preferably from about 0.1 to about 40 wt %, and even more preferably from at least 7 wt % to about 30 wt %, most preferably from about 10 to about 30 wt % based on weight of the composition.

Without wishing to be bound by any theory, it is believed upon drying of the ink composition, either the formation of hydrogen-oxygen bonds form a complex in and around the pigment or dye, or the formation of siloxane bonds between metal oxides form a complex in and around the pigment and/or dye, or a combination thereof. One or more of these formations can be a factor in decreasing the dry time, increasing the water-and-smear (wet or dry) resistance of a print, increasing the darkness or optical density, and providing better quality images with less intercolor bleed compared to the same system lacking the metal oxide.

The ink composition of the present invention may also include a coupling agent. Examples of such coupling agents include silane coupling agents like 3-aminopropyl triethoxysilane and vinyltrimethoxy silane, zirconates, titanates, and the like. Such coupling agents can be used to improve film properties, such as optical density and waterfastness.

When the ink composition is employed as an inkjet ink composition, conventional additives and respective amounts may also be incorporated therein. Such additives include humectants, anticrusting agents, biocides, penetrants, dispersing aids, and the like.

Humectants are added to prevent the ink composition from drying in the print head. Examples of humectants include, but are not limited to, 1,4-butanediol, 1,2,4-butanetriol, di(ethylene) glycol, di(propylene) glycol, di(ethylene) glycol butyl ether, glycerol, 1-methyl-2-pyrrolidinone, 1-5-pentanediol, 1,2-propanediol, 2-pyrrolidinone, 2,2-thiodiethanol, glycerol ethoxylate, polyglycols, and the like.

Anticrusting agents are added to prevent caking of colorants in and around the nozzle opening. Examples of anticrusting agents include, but are not limited to, betaine, dimethyl sulfoxide (DMSO), urea, and the like.

The ink compositions of the present invention can be prepared as any conventional ink composition which in general involves the grinding or milling and dispersing or mixing of the colorant in the ink vehicle along with the other ingredients, including any optional additives, e.g., dispersing aids. The metal oxide used in the present invention can be added at any stage of preparation of the ink composition. For instance, the metal oxide can be added to the ink vehicle before the addition of other ingredients or can be added after the addition of all other ingredients or any point in between. Preferably, the colorant and the metal oxide have a particle size of about 1 micron or less, especially for inkjet ink particles. Dispersing aids can optionally not be present, especially if a pigment is used which has an attached organic group as described earlier.

In preparing inkjet inks of the present invention which employ a pigment as a colorant, sequential filtration of the inks through filters of descending sizes and/or other means of removing large particles may be used to obtain a more desirable final product such as centrifugation. For example, filtering first with a 3.0 micron filter and then filtering with a 1.0 micron filter, and so on, as desired. In addition, the size of the pigments employed in the inkjet inks of the present invention is preferably no larger than about 2 microns, more preferably the size is one micron or less.

In contrast to ink compositions not containing the specific colorant in combination with a metal oxide particles, the ink composition of the present invention preferably provides improved properties such as decreased drying time of the ink, increased water-and-smear-resistance of the image, increased optical density of the print, and/or better quality images with less intercolor bleed. One or more of these properties can be improved with the incorporation of at least one metal oxide into the ink composition in a sufficient amount to improve the desired properties. Generally, this amount will be from about 0.01 wt % to about 49.5 wt %, and more preferably about 10 wt % to about 30 wt % based on the weight of the ink composition.

Preferably, the optical density can be increased at least about 5%, and preferably from about 5% to about 20% or more compared to an ink composition containing no metal oxide.

Accordingly, the present invention also relates to an ink recording method, preferable an inkjet ink recording method, wherein the method comprises the step of applying ink discharged from an ink recording head onto a recording medium wherein the ink comprises one of the ink compositions described above which forms a part of the present invention. Preferably, the ink is an inkjet ink composition based on the inkjet ink formulations described above.

The following examples are intended to illustrate, not limit, the claimed invention.

EXAMPLE

The following examples were conducted to determine the compatibility and effect of various metal oxides with inkjet pigments and/or dyes. All "%" are by weight of the ink composition unless indicated otherwise. All chemicals used were reagent grade or higher quality.

Example 1

One-hundred grams of the carbon black with a B.E.T., nitrogen surface area of 200 $m^2/g$ and a DBPA of 122 mL/100 g, 11.1 g of N-(4-aminobenzoyl)-B-alanine, 400 g of distilled water, and 3.66 g of sodium nitrite were mixed in an eight inch pin pelletizer at 70° C. at a rate of 650 rpm for three minutes. The resulting treated carbon black was then diluted to approximately 15% (w/w) final concentration with deionized water and filtered to remove particulates greater than 1 um in diameter.

Example 2

Example 2 was prepared and filtered in the same manner as Example 1, except that 12.07 g of p-aminobenzoic acid was used instead of N-(4-aminobenzoyl)-B-alanine, and 6.07 g of sodium nitrite was used.

Example 3

Example 3 is identical to Example 2, except that it was also passed through an ammonium cation exchange column that replaced sodium counterions with ammonium counterions.

Example 4

Example 4 was prepared and filtered in the same manner as Example 1, except that 13.8 g of 4-aminosalicyclic acid was used instead of N4(4-aminobenzoyl)-B-alanine, and 6.2 g of sodium nitrite was used.

Example 5

CAB-O-JET® 300 pigment dispersion, Cabot Corporation, Ludox® colloidal silica dispersions, and distilled water were mixed together to form compositions. The carbon black had a solid content of 5% by weight in all of the compositions. The silica (solid) content varied from 0.01% to 30% by weight in the compositions. Stability of the compositions were determined by visual observations with an Olympus light microscope using a calibrated lens at 400× magnification. The compositions were considered stable if >95% of the particles were below one micron in size at one and twenty-four hours after mixing. The compositions were drawn down on Xerox 4024 dual purpose, 20 lb. Stock using a 3 mil (3/1000 inch) Bird applicator and a Byk-Chemie automatic draw down device. The results are listed in Table 1.

TABLE 1

| Sample No. | Ludox ® Grade | Amount of Silica (wt %) | Optical Density |
| --- | --- | --- | --- |
| 1 |  | None | 1.46 |
| 2 | AS | 0.01% | 1.43 |
| 3 |  | 0.1% | 1.48 |
| 4 |  | 1.0% | 1.48 |
| 5 |  | 10% | 1.53 |
| 6 |  | 20% | 1.71 |
| 7 |  | 27% | 1.83 |
| 8 | LS | 0.1% | 1.49 |
| 9 |  | 1.0% | 1.42 |
| 10 |  | 10% | 1.56 |
| 11 |  | 20% | 1.75 |
| 12 | SM | 0.1% | 1.51 |
| 13 |  | 1.0% | 1.50 |
| 14 |  | 10% | 1.53 |
| 15 |  | 20% | 1.72 |
| 16 | TM | 0.1% | 1.48 |
| 17 |  | 1.0% | 1.46 |
| 18 |  | 10% | 1.64 |
| 19 |  | 20% | 1.73 |
| 20 |  | 30% | 1.82 |

It was found that the compositions comprising the carbon product and silica particles are stable except for samples 15 and 20. The optical density of the draw downs increased with an increase in silica content. This example shows that inks can be formed with carbon products and various types of colloidal silica that are stable and have higher optical densities for draw downs with silica compared to those without.

Example 6

Three inkjet inks were made using carbon blacks (CAB-O-JET® 300 black and Example 1 product), glycol and/or pyrrolidimone, alcohol, and distilled water (Table 2). Formulations were made with 0 or 20% final weight of Ludox®-AS silica. The inkjet inks were placed in emptied and cleaned Canon BC-02 cartridges and printed with a Canon BubbleJet® BJ-4200 inkjet printer. The inks were printed onto Xerox 4020 paper, previously described, and Plover Bond Paper (permanized PLOVER BOND paper by Fox River Paper Co. 25% Cotton fiber Shocking White cockle, long grain). The optical densities were measured as well as the dry time. The dry time test involves holding the paper at a 45° angle and applying 0.03 ml of distilled water to a solid print line and noting the time when no noticeable run-off of ink occurs. The results are shown in Table 3.

TABLE 2

Inkjet Ink Formulations A–C

| Formulation | Ingredients |
|---|---|
| A | 3 wt % Carbon Black Product |
|   | 10 wt % Ethylene Glycol |
|   | 10 wt % 2-Pyrrolidinone |
|   | 4 wt % Isopropyl alcohol |
| B | 3 wt % Carbon Black Product |
|   | 15 wt % Ethylene Glycol |
|   | 4 wt % Isopropyl alcohol |
| C | 3 wt % Carbon Black Product |
|   | 15 wt % Glycerol |
|   | 4 wt % Isopropyl alcohol |

Table 3 shows results of formulations A–C with and without silica.

TABLE 3

| Formulation | Carbon black product | Silica (Amount and Type) | Xerox OD | Xerox Dry Time | Plover OD | Plover Dry Time |
|---|---|---|---|---|---|---|
| A | CAB-O-JET ® 300 | none | 1.4 | 10 min | 1.45 | 1 min |
| A | CAB-O-JET ® 300 | 20% Ludox ® -AS | 1.45 | 5 min | 1.46 | 1 min |
| B | CAB-O-JET ® 300 | none | 1.43 | 1 min | 1.37 | 1 min |
| B | CAB-O-JET ® 300 | 20% Ludox ® -AS | 1.44 | 5 min | 1.46 | 1 min |
| C | CAB-O-JET ® 300 | none | 1.44 | 1 min | 1.36 | 1 min |
| C | CAB-O-JET ® 300 | 20% Ludox ® -AS | 1.43 | 5 min | 1.44 | 1 min |
| A | Example 1 | none | 1.16 | 1 min | 1.41 | 1 min |
| A | Example 1 | 20% Ludox ® -AS | 1.41 | 1 min | 1.47 | 1 min |

These results show that inkjet inks can be prepared with and without metal oxides. Inks containing the silica showed an increase in optical densities of the resulting prints compared to similar inks lacking the silica. The results also show that different ink formulations and different carbon black products may be used with the silica.

Example 7

This example shows the effect of adding various alcohol co-solvents to ink compositions. Stable inks were formulated with 5 wt % CAB-O-JET® 300 black, 10% by wt Ludox®-AS silica, distilled water and 0%, 10%, or 20% alcohol. Optical densities of the drawdowns are reported in Table 4.

TABLE 4

| % Alcohol in Ink | Alcohol | OD |
|---|---|---|
| 0 | None | 1.56 |
| 10 | Methanol | 1.70 |
| 20 | Methanol | 1.59 |
| 10 | Ethanol | 1.63 |
| 10 | Isopropyl alcohol | 1.65 |

These results indicate that inks can be formulated with aqueous and non-aqueous solvents. The addition of alcohol resulted in an increase in optical densities.

Example 8

Three stable inkjet inks were made using CAB-O-JET® 300 black, glycerol, and/or ethylene glycol, ethanol, and distilled water (Table 5). Formulations were made with 0 or 20% final weight of Ludox®-AS silica. The optical densities of the drawdowns were measured. The pH, viscosity, and surface tension of the inks were measured using a Corning pH meter, Shell cup #2 (from Norcross), and a CSC DuNouy Tensiometer, respectively.

TABLE 5

| Sample | Additives (wt %) | Amount of Silica (wt %) | O.D. | pH | Visc. | S.T. |
|---|---|---|---|---|---|---|
| 5A | 20% Glycerol | none | 1.36 | 8.3 | 2.17 | 54 |
| 5B | 20% Glycerol | 20% | 1.63 | 8.3 | 3.32 | 43 |
| 5C | 10% Glycerol 10% EG | none | 1.44 | 8.4 | 2.20 | 49 |
| 5D | 10% Glycerol 10% EG | 20% | 1.76 | 8.4 | 3.24 | 50 |
| 5E | 20% Glycerol 4% Ethanol | none | 1.46 | 8.4 | 2.29 | 55 |
| 5F | 20% Glycerol 4% EtOH | 20% | 1.66 | 8.3 | 3.77 | 54 |

As Table 5 shows, the optical density increased with the introduction of the silica into the ink formulation.

Example 9

Samples 5a, 5b, 5e, and 5f were placed in emptied and cleaned HP5164A cartridges and printed with a Hewlett Packard DeskJet 850C printer. The inks were printed onto Xerox 4024 paper, previously described, where print OD, previously described, and dry time were measured. The dry time test involves holding the paper at a 45° angle and applying 0.03 ml of distilled water to a ⅛ inch solid print line, at different time intervals after printing, and noting the time when no noticeable carbon black run-off of ink occurs. Table 6.

TABLE 6

| | Xerox Paper | | Plover Paper | |
|---|---|---|---|---|
| SAMPLE | Optical density | Dry Time | Optical Density | Dry Time |
| 5A | 1.3 | >1 hour | 1.23 | 5 min |
| 5B | 1.39 | 1 hour | 1.45 | 5 min |
| 5E | 1.44 | >1 hour | 1.36 | 5 min |
| 5F | 1.59 | 5 min | 1.62 | 5 min |

Again, as shown in Table 6, optical density of prints increased when silica was present and dry time (rate of water fastness) was improved.

Example 10

CAB-O-JET® 300 pigment dispersion, Cabot Corporation, Ludox® colloidal silica dispersions, and distilled water were mixed together to form stable compositions. The carbon black had a solid content of 5% by weight in all of the compositions. The silica (solid) content remained constant at 20 wt %, although the ratios of Ludox®-AS, -SM, and -LS were varied in the compositions. A composition with 0% silica was made and tested similarly. The compositions were drawn down on Xerox 4024 and optical densities measured as described previously. Smear resistance was measured by applying an Avery Hi-Liter® Long-lasting Fluorescent Highlighting Marker series #24-OXX once across ½ inch of the drawdown. The results are listed in Table 7.

TABLE 7

All With 5 wt % COJ300 and 20 wt % SiO$_2$

| Ludox ® (wt %) (Amount and Type) | Optical Density | Smear Resistance |
|---|---|---|
| 20% AS | 1.71 | Poor |
| 15% AS:5% SM | 1.68 | Fair |
| 10% AS:10% SM | 1.69 | Good |
| 5% AS:15% SM | 1.69 | Good |
| 20% SM | 1.72 | Very Good |
| 15% AS:5% L[001b]S | 1.68 | Poor |
| 10% AS:10% LS | 1.73 | Fair |
| 5% AS:15% LS | 1.73 | Good |
| 20% LS | 1.75 | Very Good |

The above examples show that the Ludox®-AS silica and Ludox®-LS silica were compatible with the 5 wt % CAB-O-JET® 300 pigment dispersion, and that combinations of different grades of metal oxides can be used. Also, the optical density and smear resistance increased with the metal oxide present.

Example 11

Various inkjet base formulations were made as shown in Table 8 below using the procedure of Example 5 except the pigment dispersion of Example 3 was used in each of the samples and the amounts of the Ludox® silica was varied from amounts of 1% by weight (dry) basis to 20% by weight (dry) basis and one additional sample of Ludox®-SM silica was used at 10% by weight (dry) basis. Optical densities of the drawdowns were conducted in the same manner as in Example 5 and the results are set forth in Table 8 below.

TABLE 8

| Silica Amount (wt %) and Type | Draw Down Optical Density |
|---|---|
| 0 | 1.24 |
| 1% - Ludox ® AS | 1.26 |
| 5% - Ludox ® AS | 1.43 |
| 10% - Ludox ® AS | 1.64 |
| 20% - Ludox ® AS | 2.00 |
| 10% - Ludox ® AS | 1.53 |

The above examples show that the Ludox® silica was compatible with the pigment dispersion and that optical densities increased with the presence of the silica and the optical densities increased as more silica was present in the ink samples.

Example 12

Various inkjet based formulations were made as shown in Table 9 using the 3 wt % of carbon product of either Example 2 or Example 3 with and without silica particles. Various amounts of Ludox® silica, either Ludox®-AS or -SM, were used in amounts as shown in Table 9. The various formulations were prepared in the same manner as in Example 6 except each of the samples had a 10% by weight Liponic EG and 10% by weight 1,2-propanediol present. The inks were printed in the same fashion as in Example 6. Table 9 sets forth the measured optical density, dry time, and smear resistance which were measured as in the previous examples.

TABLE 9

| Carbon Black Product | Silica Amount (wt %) and Type | Draw down | Xerox Paper OD | Xerox Paper Dry Time | Plover Paper OD | Plover Paper Dry Time | Smear Resistance (for both papers) |
|---|---|---|---|---|---|---|---|
| Example 3 | None | 1.29 | 1.11 | >1 hour | 1.10 | >1 hour | Poor |
| Example 3 | 10% Ludox ® AS | 1.55 | 1.27 | >1 hour | 1.24 | 1 hour | Fair |
| Example 3 | 20% Ludox ® AS | 2.25 | 1.18 | >1 hour | 1.17 | 1 hour | Fair |
| Example 3 | 10% Ludox ® SM | 1.46 | 1.10 | >1 hour | 1.04 | >1 hour | Good |
| Example 2 | None | 1.38 | 1.25 | >1 hour | 1.30 | >1 hour | Bad |
| Example 2 | 20% Ludox ® AS | 2.07 | 1.32 | >1 hour | 1.28 | >1 hour | Fair |
| Example 2 | 10% Ludox ® SM | 1.56 | 1.29 | >1 hour | 1.20 | >1 hour | Good |

As shown in Table 9, optical density as measured with prints from a Canon 4200 BJC increased with the use of silica and smear resistance was also improved and may decrease print dry time.

Example 13

Carbon black product from Example 3 was mixed with various amounts of Snowtex® 40 grade silica and distilled water. The compositions were drawn down and the optical densities, dry time, and highlighter smear were measured as previously described. The results are shown in Table 10.

TABLE 10

| Amount of Snowtex ® 40 (wt %) | Optical Density | Dry Time | Smear Resistance |
|---|---|---|---|
| none | 1.26 | >5 min. | fair |
| 10% | 1.67 | >5 min. | good |
| 20% | 1.98 | 5 min. | very good |
| 24.6% | 2.14 | 5 min. | excellent |

As shown in Table 10, compositions with other commercially available grades of silica may also cause an increase in the optical density, decreased dry time, and improvement in smear resistance compared to inks lacking silica.

Example 14

Carbon black product from Example 3 was mixed with various amounts of Ludox®-AS grade silica, coupling agents, and distilled water. The compositions were drawn down and the optical densities and dry time were measured as previously described. The coupling agents used were either 3-aminopropyltriethoxysilane (ATS) or vinyltrimethoxysilane (VTS). The results are shown in Table 11.

TABLE 11

| wt % $SiO_2$ Ludox ®-AS | wt % VTS | wt % ATS | Optical Density | Dry Time |
|---|---|---|---|---|
| 0 | 0 | 0 | 1.24 | >5 min. |
| 5% | 0 | 0 | 1.43 | >5 min. |
| 5% | 0.05 | 0 | 1.44 | >5 min. |
| 5% | 0 | 0.05 | 1.34 | >5 min. |
| 10% | 0 | 0 | 1.64 | >5 min. |
| 10% | 0.1 | 0 | 1.68 | >5 min. |
| 10% | 1 | 0 | 1.83 | >5 min. |
| 10% | 0 | 0.1 | 1.72 | >5 min. |
| 15% | 0 | 0 | 1.71 | >5 min. |
| 15% | 0.15 | 0 | 1.87 | >5 min. |
| 15% | 0 | 0.15 | 1.88 | 5 min. |
| 20% | 0 | 0 | 2.00 | 5 min. |
| 20% | 0.5 | 0 | 2.03 | 5 min. |
| 20% | 1 | 0 | 2.03 | 5 min. |
| 20% | 2 | 0 | 2.13 | 5 min. |
| 20% | 0 | 0.5 | 2.03 | 5 min. |
| 20% | 0 | 1 | 1.94 | 5 min. |

This example shows that the addition of both silica and a coupling agent improves optical density and dry time compared to a sample without one or both.

Example 15

Various injet base formulations were made as set forth in Table 12 using CAB-O-JET® 300 dispersion or the pigment dispersion of Example 3. In particular, inkjet base formulations were prepared in the same manner as in Example 5 except silicas from Cabot Corporation were used in the amounts indicated in Table 12. The optical densities were measured in the same fashion as Example 5.

TABLE 12

| Carbon Black Type | Silica (Amount wt % and Type) | Optical Density |
|---|---|---|
| CAB-O-JET ® 300 | none | 1.38 |
| CAB-O-JET ® 300 | 1% CAB-O-GUARD ® LT111 | 1.55 |
| CAB-O-JET ® 300 | 2% CAB-O-GUARD ® LT111 | 1.63 |
| CAB-O-JET ® 300 | 5% CAB-O-GUARD ® LT111 | 1.69 |
| CAB-O-JET ® 300 | 10% CAB-O-GUARD ® LT111 | 1.80 |
| Example 3 | none | 1.26 |
| Example 3 | 5% CAB-O-SPERSE ® A2095 | 1.79 |
| Example 3 | 10% CAB-O-SPERSE ® A2095 | 1.97 |
| Example 3 | none | 1.26 |
| Example 3 | 5% CAB-O-SPERSE ® P1010 | 1.65 |
| Example 3 | 10% CAB-O-SPERSE ® P1010 | 1.94 |
| Example 3 | 15% CAB-O-SPERSE ® P1010 | 2.05 |
| Example 3 | 18.45% CAB-O-SPERSE ® P1010 | 2.13 |

As shown in Table 12, the optical density increased with the introduction of silica at various amounts. Also, the optical density increased as the amount of silica increased in the ink formulation.

Example 16

The effects of other metal oxides, such as aluminum oxide ($Al_2O_3$), Aldrich, and iron oxide ($Fe_3O_4$), Aldrich, on ink compositions, were determined. In particular, various inkjet base formulations were prepared in the same fashion as in Example 5 except the pigment dispersion of Example 4 was used and in lieu of silica, aluminum oxide, or iron oxide was used in the amounts indicated by weight (dry) basis. Optical density was recorded in the same fashion as in Example 5 and the results set forth in Table 13 below.

TABLE 13

| Metal Oxide (Amount (wt %) and Type) | Optical Density |
|---|---|
| none | 1.24 |
| 0.5% $Al_2O_3$ | 1.35 |
| 1 % $Al_2O_3$ | 1.25 |
| 5 % $Al_2O_3$ | 1.24 |
| 0.5% $Fe_3O_4$ | 1.31 |
| 1 % $Fe_3O_4$ | 1.28 |
| 5 % $Fe_3O_4$ | 1.31 |
| 10% $Fe_3O_4$ | 1.35 |

As can be seen from Table 13, the samples containing various amounts of aluminum oxide or iron oxide increased the optical density.

Example 17

In this example, the colorant used was a dye, BASACID®Black X34 from BASF. Various inkjet base formulations were made using the dye in an amount of 8% with and without Ludox®-AS silica as indicated in Table 14. The formulations were prepared and the optical density and dry time recorded as in Example 5.

TABLE 14

| Silica (Amount (wt %) and Type) | Optical Density | Dry Time |
|---|---|---|
| none | 1.39 | >1 hour |
| 20% $SiO_2$-AS | 2.04 | >1 hour |

An increase in the optical density of the drawdown containing the dye with the metal oxide was observed.

Example 18

In this example, a black pigment, HOSTAFINE® Black TS Pigment from Hoeschst Celanese was used in an amount of 5 wt % to prepare various inkjet base formulations with and without Ludox®-AS silica as indicated in Table 15 below. The formulations were prepared and the optical density, waterfastness, and smear resistance were determined as in the previous examples.

TABLE 15

| Silica (Amount (wt %) and Type) | Optical Density | Dry Time | Smear Resistance |
|---|---|---|---|
| none | 1.11 | 1 hour | Poor |
| 20% SiO$_2$ | 2.20 | 1 hour | Good |

As can be seen from the results above, the presence of silica in the ink formulation greatly increased the optical density of the drawdown as well as improved the smear resistance of the drawdown.

Example 19

Various injet base formulations were prepared using the pigment of Example 4 with and without silica. In particular, ink formulations containing 5% by weight pigment, 10% by weight ethylene glycol, 10% by weight di(ethylene glycol), 4% by weight isopropyl alcohol with and without 20% by weight (dry) basis Ludox®-AS silica were prepared in the same fashion as in Example 6. The inks were printed in the same fashion as in Example 7 and the results are set forth in Table 16 below.

TABLE 16

| Silica | Xerox 4024 Paper | | Plover Bond Paper | | Highlighter Rub |
|---|---|---|---|---|---|
| (Amount and Type) | Optical Density | Waterfast Time (min) | Optical Density | Waterfast Time (min) | Resistance (both papers) |
| none | 1.58 | 1 | 1.52 | 5 | Fair |
| 20 wt % | 1.68 | 5 | 1.62 | 5 | Good |

The results show that the addition of silica to an ink formulation increases the optical density of the print, improves the highlighter rub resistance, and does not significantly change the time to achieve waterfastness of the print.

Other embodiments of the present invention will be apparent to those skilled in the art from consideration of the present specification and the practice of the invention disclosed herein. It is intended that the specification and examples be considered as exemplary only, with a true scope and spirit of the invention being indicated by the following claims.

What is claimed is:

1. An inkjet ink composition comprising at least one inkjet ink vehicle and a mixture of at least one pigment and at least one metal oxide, wherein said pigment comprises at least one organic group attached thereto or as a part thereof, said at least one organic group comprising at least one aromatic group or a $C_1$–$C_{12}$ alkyl group.

2. The inkjet ink composition of claim 1, wherein said pigment is non-reactive with said metal oxide in said inkjet in vehicle.

3. The inkjet ink composition of claim 1, wherein said pigment comprises at least one organic group attached thereto or as a part thereof, said at least one organic group comprising (a) at least one aromatic group or a $C_1$–$C_{12}$ alkyl group and (b) at least one ionic group, at least one ionizable group or a mixture of an ionic group and an ionizable group.

4. The inkjet ink composition of claim 3, wherein said aromatic group or said $C_1$–$C_{12}$ alkyl group are directly attached to the pigment.

5. The inkjet ink composition of claim 1, wherein the pigment is carbon black, graphite, vitreous carbon, finely-divided carbon, activated charcoal, activated carbon, or mixtures thereof.

6. The inkjet ink composition of claim 1, wherein the pigment is carbon black.

7. The inkjet ink composition of claim 3, wherein the pigment is carbon black, graphite, vitreous carbon, finely-divided carbon, activated charcoal, activated carbon, or mixtures thereof.

8. The inkjet ink composition of claim 3, wherein the ionic or ionizable group is a carboxylic acid, a sulfonic acid group, a sulfophenyl group, a carboxyphenyl group, a quaternary ammonium group, a sulfonamide group, or a salt thereof.

9. The inkjet ink composition of claim 3, wherein the organic group is a p-$C_6H_4SO_3Na$.

10. The inkjet ink composition of claim 3, wherein the ionic or ionizable group has the formula —$SO_2NHCOR$ or a salt thereof, where R is a $C_1$–$C_{20}$ alkyl or a phenyl group.

11. The inkjet ink composition of claim 1, wherein the organic group has the formula p-$C_6H_4SO_2NH_2$.

12. The inkjet ink composition of claim 1, wherein the metal oxide is silica.

13. The inkjet ink composition of claim 12, wherein the silica is colloidal silica.

14. The inkjet ink composition of claim 12, wherein the silica is precipitated silica.

15. The inkjet ink composition of claim 12, wherein the silica is fumed silica.

16. The inkjet ink composition of claim 1, wherein the metal oxide is an oxide of Si, Al, Fe, Zn, or Zr or mixtures thereof.

17. The inkjet ink composition of claim 1, wherein the metal oxide is $Al_2O_3$ or $Fe_3O_4$.

18. The inkjet ink composition of claim 1, wherein the metal oxide is a $Al_2O_3$-coated $SiO_2$, or a mixture of $SiO_2$ and $Al_2O_3$.

19. The inkjet ink composition of claim 1, wherein the metal oxide is present in an amount which increases optical density of the composition when dried.

20. The inkjet ink composition of claim 1, further comprising a coupling agent.

21. The inkjet ink composition of claim 1, wherein said metal oxide is an iron-containing oxide or aluminum containing oxide or both, and said composition further comprises a coupling agent.

22. The inkjet ink composition of claim 20, wherein the coupling agent is a silane coupling agent.

23. The inkjet ink composition of claim 1, wherein the ink vehicle is an aqueous inkjet ink vehicle.

24. The inkjet ink composition of claim 1, wherein the ink vehicle is a non-aqueous inkjet ink vehicle.

25. The inkjet ink composition of claim 1, wherein the organic group comprises at least one aromatic group.

26. The inkjet ink composition of claim 1, wherein the organic group comprises at least one $C_1$–$C_{12}$ alkyl group.

27. The inkjet ink composition of claim 1, wherein the pigment and the metal oxide have the same charge.

28. The inkjet ink composition of claim 1, wherein the pigment and the metal oxide are each positively charged.

29. An inkjet recording method, comprising the step of:
applying to a recording medium ink discharged from an inkjet recording head, wherein the ink comprises at least one inkjet ink vehicle and a mixture of at least one pigment and at least one metal oxide, wherein said pigment is non-reactive with said metal oxide in said inkjet ink vehicle, and said pigment comprises at least one organic group comprising at least one aromatic group or a $C_1$–$C_{12}$ alkyl group.

30. The inkjet recording method of claim 29, wherein said pigment comprises at least one organic group attached thereto or as a part thereof, said at least one organic group comprising (a) at least one aromatic group or a $C_1$–$C_{12}$ alkyl group, and (b) at least one ionic group, at least one ionizable group or a mixture of an ionic group and an ionizable group.

31. The method of claim 29, wherein the pigment is a modified carbon product comprising carbon having said aromatic group or said $C_1$–$C_{12}$ alkyl group directly attached to the carbon.

32. The method of claim 29, wherein the organic group comprises at least one aromatic group.

33. The method of claim 29, wherein the metal oxide is silica.

34. An aqueous inkjet ink composition comprising an aqueous vehicle, silica and a modified carbon product comprising carbon having attached at least one organic group, the at least one organic group comprising (a) at least one aromatic group or a $C_1$–$C_{12}$ alkyl group, and (b) at least one ionic group, at least one ionizable group, or a mixture of an ionic group and an ionizable group, wherein the at least one aromatic group or the $C_1$–$C_{12}$ alkyl group of the organic group is directly attached to the carbon.

35. A method to increase optical density of an image resulting from an ink composition comprising incorporating at least one metal oxide into said ink composition.

36. An inkjet ink composition comprising a mixture of at least one inkjet ink vehicle, at least one dye, and silica in the amount of at least 7% by weight of the composition, wherein said dye is non-reactive with said silica in the inkjet ink vehicle.

37. The inkjet ink composition of claim 36, wherein said silica is present in an amount of at least 7% by weight to about 50% by weight.

38. The inkjet ink composition of claim 36, wherein said silica is present in an amount of at least 7% by weight to about 25% by weight.

39. The inkjet ink composition of claim 36, wherein said silica is present in an amount of at least 10% by weight.

40. The inkjet ink composition of claim 36, wherein said silica is present in an amount of at least 10% by weight to about 50% by weight.

41. The inkjet ink composition of claim 36, wherein said silica is present in an amount of at least 10% by weight to about 25% by weight.

42. An inkjet ink composition comprising a mixture of at least one ink vehicle, at least one dye, and at least one oxide of Al, Fe, Zn, or Zr mixtures thereof, wherein said dye is non-reactive with said metal oxide in said ink vehicle.

43. An inkjet ink composition comprising a mixture of at least one inkjet ink vehicle, at least one pigment, and an effective amount of silica to improve the optical density of an image resulting from said ink composition.

* * * * *